(12) United States Patent
Fan et al.

(10) Patent No.: US 9,922,139 B2
(45) Date of Patent: Mar. 20, 2018

(54) METHOD AND DEVICE FOR DATA SCREENING (71) Applicant: Tencent Technology (Shenzhen) Company Limited, Shenzhen (Guangdong) (CN)

(72) Inventors: Chengtao Fan, Shenzhen (CN); Gongwei Li, Shenzhen (CN); Jiang Li, Shenzhen (CN); Haiyang Zhu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 466 days.

(21) Appl. No.: 14/341,108

(22) Filed: Jul. 25, 2014

(65) Prior Publication Data
US 2014/0365967 A1 Dec. 11, 2014

Related U.S. Application Data (63) Continuation-in-part of application No. PCT/CN2013/090506, filed on Dec. 26, 2013.

(30) Foreign Application Priority Data

Jun. 5, 2013 (CN) .................. 2013 1 02210372

(51) Int. Cl.
*G06F 3/048* (2013.01)
*G06F 17/30* (2006.01)

(52) U.S. Cl.
CPC .............................. *G06F 17/30991* (2013.01)

(58) Field of Classification Search
CPC .. G06F 3/0482; G06F 3/0481; G06F 3/04847; G06F 3/04817; G06F 3/0489;
(Continued)

(56) References Cited

U.S. PATENT DOCUMENTS 5,801,691 A * 9/1998 Dahl .................. G06F 3/0485 715/246
6,732,114 B1 5/2004 Aamodt et al.
(Continued)

FOREIGN PATENT DOCUMENTS

| CN | 101000607 A | 7/2007 |
| CN | 101576881 A | 11/2009 |
| CN | 103098049 A | 5/2013 |

OTHER PUBLICATIONS

International Search Report for priority application PCT/CN2013/090506, dated Mar. 27, 2014 (3 pages).
Chinese Office Action for Application No. 2013102210372 dated Oct. 10, 2017, and an English concise explanation of relevance thereof.

*Primary Examiner* — Shourjo Dasgupta
(74) *Attorney, Agent, or Firm* — Harness, Dickey & Pierce, P.L.C.

(57) ABSTRACT

The described technology provides a method and device for data screening, and solves the technical problem that the user needs to return to the check box interface to reset the screen element and thus the operation steps are cumbersome. The method for data screening comprises: screening raw data according to a first screen element to obtain a first result subset, the first result subset belonging to the raw data and being corresponding to the first screen element; displaying the first result subset and an element list and receiving a second screen element selected by a user according to the element list; screening the first result subset according to the second screen element to obtain a second result subset, the second result subset belonging to the raw data and being corresponding to the second screen element; displaying the second result subset. The described technology is mainly applied during the process of data statistics and screening.

11 Claims, 7 Drawing Sheets

(58) Field of Classification Search
CPC .......... G06F 3/04842; G06F 17/30696; G06F 17/30905; G06F 17/30554; G06F 9/4443; G06F 2203/04804; G06F 8/34; G06F 19/26; G05B 19/0426; G05B 2219/23258; G06Q 10/10; G09G 5/14; G09G 2370/027; G09G 2340/10; G09G 2340/02; G09G 2340/12; G06T 2200/24; H04N 5/44591; H04N 5/44504; H04N 5/44543
USPC ....... 715/825, 764, 765, 768, 771, 781, 788, 715/803, 810
See application file for complete search history.

(56) References Cited

U.S. PATENT DOCUMENTS

| | | |
|---|---|---|
| 2007/0162443 A1 | 7/2007 | Liu et al. |
| 2008/0163099 A1* | 7/2008 | Gu ............... G06Q 10/0637 715/780 |
| 2008/0222145 A1 | 9/2008 | Liu |
| 2009/0322755 A1* | 12/2009 | Holm-Peterson ....... G06T 11/20 345/440 |
| 2012/0198369 A1* | 8/2012 | Sorin ................ G06Q 10/10 715/763 |
| 2013/0055146 A1* | 2/2013 | Armitage ............ G06F 3/0481 715/781 |
| 2014/0282175 A1* | 9/2014 | Smith ............. G06F 17/30554 715/771 |

* cited by examiner

METHOD AND DEVICE FOR DATA SCREENING

CROSS REFERENCE TO RELATED APPLICATIONS

This application is a U.S. continuation application under 35 U.S.C. § 111(a) claiming priority under 35 U.S.C. § § 120 and 365(c) to International Application No. PCT/CN2013/090506 filed on Dec. 26, 2013, which claims the priority benefit of Chinese Patent Application No. 2013102210372 filed on Jun. 5, 2013, the contents of which are incorporated by reference herein in their entirety for all intended purposes.

TECHNICAL FIELD

The present invention relates to the field of computer application technology, in particular to a method and device for data screening.

BACKGROUND

With the development of computer application technology, more and more users obtain information by screening data. For example, the maintenance personnel obtain the number of male users and female users of a network game, by screening the users' age in login information of the network game, in order to improve the game rules and the interface setting of the network game according to the screened number of users with different genders.

The current screening solution is as follow: a user determines a screening element through a check box, such as age, gender and so on. A computer screens the screened data satisfying the screening element from the data to be screened, then displays the screened date to the user.

In the process to achieve the above data screening, the inventor found that the prior art has at least the following problems: When the screening conditions change, it needs to return to the check box interface to reset the screen element which makes the operations complicated. For example, after the user screens the raw data according to the age, he/she also wants to know the different gender distribution in different age intervals, then needs to return to the check box interface to re-select the screening condition, and obtains the result subset with age and gender combined after the computer screens according to the new screening condition.

SUMMARY

The described technology provides a method and device for data screening, and solves the technical problem that the user needs to return to the check box interface to reset the screen element and thus the operation steps are cumbersome.

On one aspect, embodiments provide a method for data screening performed by a computing device, comprising:
screening raw data according to a first screen element to obtain a first result subset, the first result subset belonging to the raw data and being corresponding to the first screen element;
displaying the first result subset and an element list and receiving a second screen element selected by a user according to the element list;
screening the first result subset according to the second screen element to obtain a second result subset, the second result subset belonging to the raw data and being corresponding to the second screen element;
displaying the second result subset.

On another aspect, embodiments provide a device for data screening comprising at least a processor operating in conjunction with a memory and a plurality of units, wherein the units comprise:
a first screen unit adapted to screen raw data according to a first screen element to obtain a first result subset, the first result subset belonging to the raw data and being corresponding to the first screen element;
a display unit adapted to display the first result subset screened by the first screen unit and an element list;
a receiving unit adapted to receive a second screen element selected by a user according to the element list displayed by the display unit;
a second screen unit adapted to screen the first result subset screened by the first screen unit according to the second screen element received by the receiving unit, to obtain a second result subset, the second result subset belonging to the raw data and being corresponding to the second screen element;
wherein the display unit is also adapted to display the second result subset screened by the second screen unit.

On a further aspect, embodiments provide a computer program product comprising program codes for performing the methods described above according to the described technology when the computer program product is executed on one or more computing devices. Optionally, the computer program product can be stored on a non-transitory computer readable recording medium.

The method and device for data screening according to the described technology can screen the raw data according to the first screen element to obtain the first result subset; display the first result subset and the element list and receive the second screen element selected by the user according to the element list; screen the first result subset according to the second screen element to obtain and display the second result subset. In the prior art, after the first result subset is displayed, the user cannot be provided with the element list, causing that the user needs to return to the check box interface when increasing screen elements and the operation steps are cumbersome. In the embodiments, when the first result subset is displayed, the element list is also displayed at the same time. The described technology provides a technical solution of performing further screen based on the previous result subset. When the user performs a further screen according to the first result subset, he/she only needs to continue to choose from the element list, but not needs to return to the previous operation interface, thereby reducing the number of times the user operates and simplifying screen operations.

BRIEF DESCRIPTION OF THE DRAWINGS

In order to illustrate embodiments of the invention or the technical solutions in the prior art more clearly, the accompanying drawings, which are used for describing the embodiments or the prior art, are introduced briefly. Apparently, the drawings described below are only some of the embodiments of the described technology. A person of ordinary skill in the art can also obtain other drawings based on these drawings without paying creative work.

DETAILED DESCRIPTION

The technical solutions of the embodiments of the described technology will be described clearly and completely, combining with the accompanying drawings. Obviously, the described embodiments are only part of the embodiments of the described technology, but not all embodiments. Based on the embodiments of the described technology, all other embodiments obtained by a person of ordinary skill in the art without paying all belong to the protection scope of the embodiments.

An embodiment provides a method for data screening. The method is used in computing devices or electronic devices, such as servers, computers, tablets, smart phones, etc.

An exemplary computing device may include a processor, a storage medium, a monitor, a communication module, a database, peripherals, and one or more bus to couple the modules together. Certain modules may be omitted and other modules may be included. The processor may include any appropriate processor or processors. Further, the processor can include multiple cores for multi-thread or parallel processing. The storage medium may include memory modules, such as ROM, RAM, and flash memory modules, and mass storages, such as CD-ROM, U-disk, removable hard disk, etc. The storage medium may store computer programs for implementing various processes, when executed by processor. Further, the monitor may include display devices for displaying certain user interface contents such as splash screens. The peripherals may include I/O devices such as keyboard and mouse, and communication module may include network devices for establishing connections through the communication network. The database may include one or more databases for storing certain data and for performing certain operations on the stored data, such as database management, data extraction/analysis.

Figure 1:
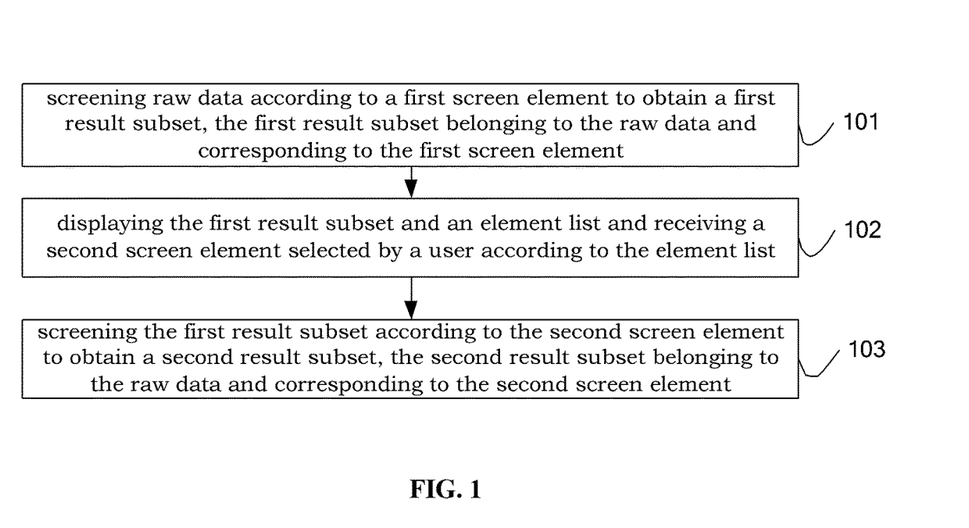
FIG. 1 is a flowchart of a method of data screening according to an embodiment.

The method, shown in FIG. 1, comprises:

Step 101 is screening raw data according to a first screen element to obtain a first result subset, the first result subset belonging to the raw data and corresponds to the first screen element;

The raw data has at least one element including the first screen element. During screening, element values are determined according to the content of the first screen element, and the data having the same element values are screened from the raw data and are counted.

For example, the elements of the raw data are age, gender, education, city and so on. If the first screen element is gender, then the raw data (with 20 records) is screened by gender. The first result subset obtained includes the screen results having a "male" element (with 15 records) and the screen results having a "female" element (with 5 records).

Optionally, the raw records may be stored through a data table, as shown in Table 1, the raw record contains N records with each record all having serial number, age, gender, education, city and other attributes.

TABLE 1

| serial number | age | gender | education | ... | city |
| --- | --- | --- | --- | --- | --- |
| 1 | 8 | male | elementary school | ... | Beijing |
| 2 | 15 | Female | junior high school | ... | Tianjin |
| ... | ... | ... | ... | ... | ... |
| N | 30 | male | undergraduate | ... | Shenzhen |

Step 102 is displaying the first result subset and an element list and receiving a second screen element selected by a user according to the element list.

When the first result subset is displayed, the element list is displayed at the same time. Preferably, the element list does not contain the currently selected elements. For example, the raw data records the players' information of a network game, and the currently selected elements are gender, education. The elements of the raw data are age, gender, education, city. In this case, the entries in the element list are: age and city. Optionally, the element list may contain the currently selected elements. For example, the first screen element is age, and the first screen result may include the screen results corresponding to four age groups of 0-10 years old, 10-20 years old, 20-30 years old, 30-40 years old. After the first screen result is displayed, if an user wants to know, in this screen result of 20-30 years old, the specific number of players of 20-22 years old, 23-26 years old, 26-30 years old, here, the user may select age in the check box again and screen this screen result of 20-30 again according to the above-mentioned three age groups.

The display manner of the element list may be any one of the following manners: check box, drop-down menu, text box.

The contents provided by the check box and the drop-down menu are consistent with the elements of the raw data. If it is displayed in the manner of the text box, when a second screen element is received, the format of the second screen element is determined on whether it meets the format of the raw data elements. If it does not meet, the user is prompted to re-enter. The user may also be prompted for the correct input format by displaying text information.

Figure 2A:
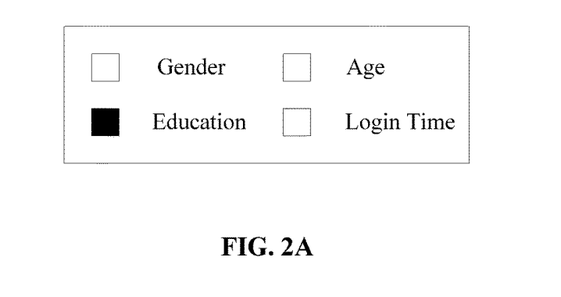
FIG. 2A is a schematic diagram of the display manner of a first element list according to an embodiment.
Figure 2B:
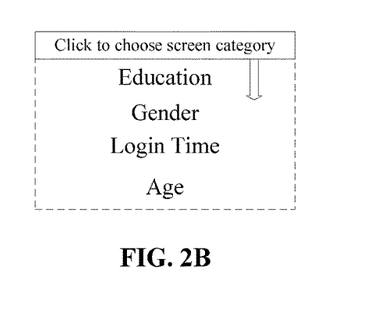
FIG. 2B is a schematic diagram of the display manner of another element list according to an embodiment.

For example, when the element list has four elements of age, gender, education, login time, it can be displayed in the manner of the checkbox, as shown in FIG. 2A. It may also be displayed in the manner of the pull-down menu as shown in FIG. 2B, and also be displayed in the manner of the text box.

Step 103 is screening the first result subset according to the second screen element to obtain a second result subset, the second result subset belonging to the raw data and corresponds to the second screen element.

The first result subset is screened in the same manner as the raw data is screened according to the first screen element in step 101. For example, the first result subset is the screen result corresponding to the gender element of "male". In step 103, after screening the first result subset according to the second screen elements, such as age, the screening result (the second result subset) corresponding to four age groups of 0-10 years old, 10-20 years old, 20-30 years old, 30-40 years old in male, may be obtained.

Step 104 is displaying the second result subset.

The second result subset is displayed, optionally, the element list is displayed at the same time, so that the user may further screen. The method according to the embodiments may be executed in loop, both the first screen element and the second screen element are elements of the raw data. Here, the terms "first" and "second" are to represent multiple screens, but the described technology is not limited to twice screens only.

The method for data screening according to the described technology can screen the raw data according to the first screen element to obtain the first result subset; display the first result subset and the element list and receive the second screen element selected by the user according to the element list; screen the first result subset according to the second screen element to obtain and display the second result subset. In the prior art, after the first result subset is displayed, the user cannot be provided with the element list, causing that the user needs to return to the check box interface when increasing screen elements and the operation steps are cumbersome. In the described technology, when the first result subset is displayed, the element list is also displayed at the same time. When the user performs a further screen according to the first result subset, he/she only need to continue to choose from the element list, but not needs to return to the previous operation interface, thereby reducing the number of times the user operates and simplifying screen operations.

Figure 3:
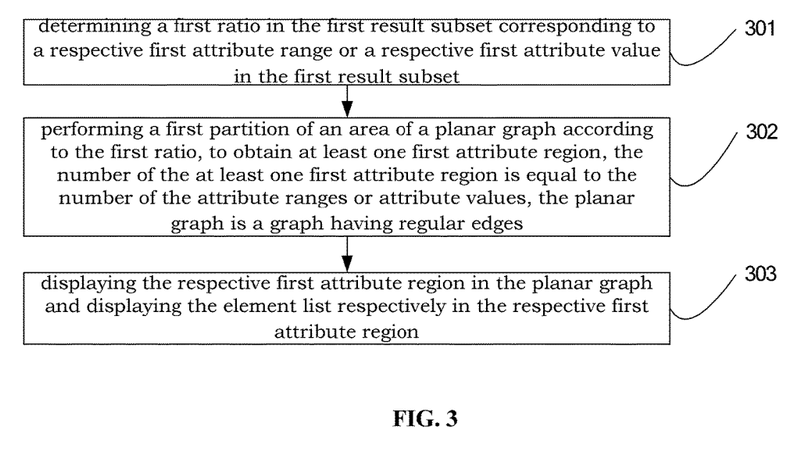
FIG. 3 is a flowchart of a second method of data screening according to an embodiment.

An embodiment also provides a method for data screening of data as shown in FIG. 3, for specifically describing the method as shown in FIG. 1, the step of displaying the first result subset and the element list may be conducted in the following manner:

Step 301 is determining a first ratio in the first result subset corresponding to a respective first attribute range or a respective first attribute value in the first result subset.

Different screen elements correspond to different attribute ranges or attribute values. For example, the screen element "gender" corresponds to the attribute values "male" and "female"; the screen element "age" corresponds the attribute ranges "0-10", "10-20", "20-30", "30-40".

After screened according to the screen elements, the screen subset corresponding to the respective attribute range or the respective attribute value is obtained. For example, the number of the original records is 20, after screened according to the screen element "gender", 15 records corresponding to the attribute value "male" and 5 records corresponding to the attribute value "female" are obtained. Here, a first ratio corresponding to the attribute value "male" is 15/20=0.75, and a second ratio corresponding to the attribute value "female" is 5/20=0.25.

Step 302, performing a first partition of an area of a planar graph according to the first ratio to obtain at least one first attribute region, the number of the at least one first attribute region is equal to the number of the attribute ranges or attribute values, the planar graph is a graph having regular edges.

The graph is a graph having regular edges, such as rectangular, circular, polygon (more than four edges), etc.

According to the first ratio, the area of the respective attribute range or attribute value in the planar graph is calculated. For example, in the previous embodiment, the first ratio corresponding to the attribute value "male" is 0.75, and the first ratio corresponding to the attribute value "female" is 0.25. Here, the area of the planar graph is divided into four equal partitions, with three adjacent partitions assigned to the attribute value "male", as the first attribute region corresponding to the attribute value "male"; and the remaining one partition is assigned to the attribute value "female", as the first attribute region corresponding to the attribute value "female".

Step 303 is displaying the respective first attribute region in the planar graph and displaying the element list respectively in the respective first attribute region.

According to the first ratio, the area and location of the first attribute region corresponding to the respective attribute range or the respective attribute value in the planar graph can be determined. The element list is displayed in the respective attribute region, so that the users may perform further screen according to the entries in the element list.

Figure 4:
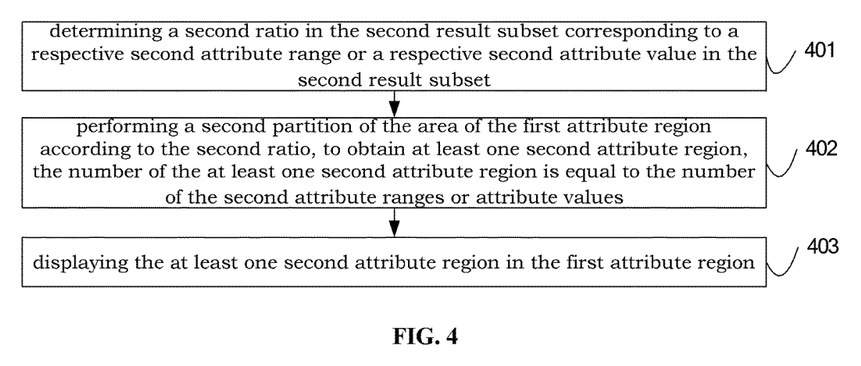
FIG. 4 is a flowchart of a third method of data screening according to an embodiment.

In FIG. 1, the step of displaying the second result subset may be conducted in the following manner, as shown in FIG. 4:

Step 401 is determining a second ratio in the second result subset corresponding to a respective second attribute range or a respective second attribute value in the second result subset.

The second ratio is determined in the same manner as the first ratio.

Step 402 is performing a second partition of the area of the first attribute region according to the second ratio, to obtain at least one second attribute region, the number of the at least one second attribute region is equal to the number of the second attribute ranges or attribute values.

Performing a first partition of an area of a planar graph according to the first ratio comprises:

performing a longitudinal partition of the area of a rectangle according to the first ratio.

Performing a second partition of the area of the first attribute region according to the second ratio comprises:

performing a transversal partition of the area of the first attribute region according to the second ratio.

When the second partition of the area of the first attribute region is performed, the manner of the partition may be adjusted according to that of the first partition. If the first partition is a transversal partition, then the second partition is a longitudinal partition, and so forth. If the user selects a screen element again according to the element list, when performing partition of the second attribute region according to the ratio of the screen subset corresponding to said screen element, the user may use the same partition manner as that of the first partition, to achieve different results from the different partition manners of the two adjacent partitions.

Step 403 is displaying at least one second attribute region in the first attribute region.

When at least one second attribute region is displayed, since the second screen element is selected based on the first screen subset, all the second attribute regions determined according to the second screen element are displayed in the first attribute region.

Optionally, the first ratio and the first attribute range information (the first attribute value information) corresponding to the first screen element are displayed when the first result subset is displayed, the second ratio and the second attribute range information (the second attribute value information) corresponding to the second screen element are displayed when the second result subset is displayed Further, displaying the respective first attribute region in the planar graph may be conducted in the following manner:

displaying the respective first attribute region in the planar graph according to varied colors, the colors corresponding to the respective first attribute regions are different.

displaying the at least one second attribute region in the first attribute region may be conducted in the following manner:

displaying the at least one second attribute region in the first attribute region according to varied transparencies or color intensities, the transparencies or color intensities corresponding to the respective second attribute regions are different.

In order to distinguish the first result subset and the second result, when the first attribute region corresponding to the first result subset and the second attribute region corresponding to the second result subset are displayed, the display manners need to be distinguished. The respective first attribute regions may first be shown in varied colors, and then the respective second attribute regions may be shown in varied color intensities. The respective first attribute regions may also first be shown in varied color intensities of one color, and then the respective second attribute regions may be shown in varied colors.

The method for data screening according to the embodiment may determine the first ratio according to the first screen element, display a first attribute region and the element list according to the first ratio, and thereby illustratively display the ratio relationship in the first result subset. By performing the first partition of the original graph and performing the second partition of the first attribute region, the ratio relationship between the respective attribute regions and the respective attribute values may be clearly displayed. By selecting the element list in the first attribute region, the user may perform further screen in one first attribute region and the user operation is simplified.

Figure 5:
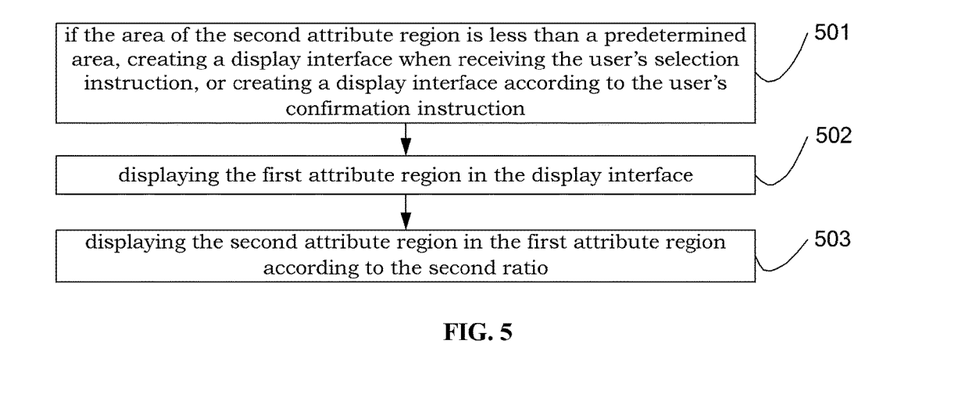
FIG. 5 is a flowchart of a fifth method of data screening according to an embodiment.

An embodiment further provides a method for data screening, as the further illustration to the method shown in FIG. 1, as shown in FIG. 5, the method further comprise:

Step 501, if the area of the second attribute region is less than a predetermined area, creating a display interface when receiving the user's selection instruction, or creating a display interface according to the user's confirmation instruction;

Step 502, displaying the first attribute region in the display interface;

Step 503, displaying the second attribute region in the first attribute region according to the second ratio.

The size of the predetermined area may be fixed, or a certain ratio of the screen.

When performing partition of the planar graph according to the first ratio, it may appear that the first attribute region after partition is less. Here, if the user selects the second screen element for screening, then the first attribute region does not have sufficient area to display the second result subset and thus an display interface needs to be created for display.

It should be noted that the method shown in FIG. 5 can also be applied to the second attribute region, i.e., whenever a selection instruction issued by the user is received, whether the area of the first attribute region (the second attribute region) where the selection instruction locates is less than a predetermined area is determined. If less, the first attribute region (the second attribute region) is displayed in the display interface, then the second attribute region is displayed in the first attribute region according to the second ratio (or according to the ratio obtained through the second screen element).

The method for data screening according to the embodiment may determine to create a display interface when receiving the user's selection instruction according to area size of the first attribute region or the second attribute region, and display the screen result in the created display interface, and clearly show the screen result, and at the same time provide display space for further screen.

Figure 6:
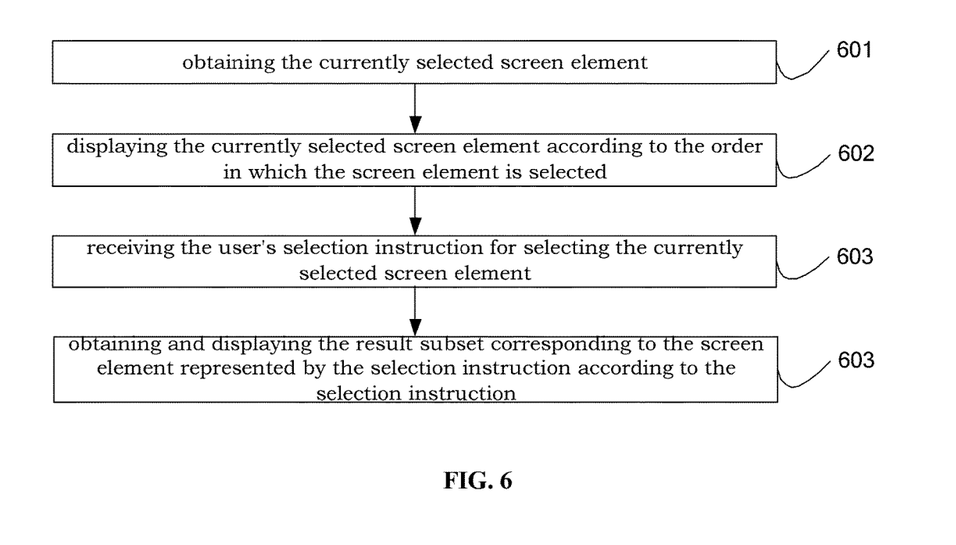
FIG. 6 is a flowchart of a sixth method of data screening according to an embodiment.

The embodiment of the invention also provides a method for data screen, as shown in FIG. 6, comprising:

Step 601, obtaining the currently selected screen element.

A person skilled in the art may understand that, in order to obtain the currently selected screen element and the screen subset corresponding to the screen element, when the first result subset (or the second result subset) is obtained according to the first screen element (or the second screen element), the first screen element (or the second screen element) and the first result subset (or the second result subset) are saved, and the correspondence relationship between the first screen element (or the second screen element) and the first result subset (or the second result subset) are saved at the same time.

Step 602 is displaying the currently selected screen element according to the order in which the screen element is selected.

The selected screen elements form a navigation list.

When displayed, the navigation list may be displayed on the left side of the planar graph or the created interface, on the top of the planar graph or the created interface, or in the created interface.

Step 603 is receiving the user's selection instruction for selecting the currently selected screen element.

Step 604 is obtaining and displaying the result subset corresponding to the screen element represented by the selection instruction according to the selection instruction.

According to the saved correspondence relationship, the result subset corresponding to the screen element represented by the selection instruction is obtained and displayed. At the same time, the navigation list corresponds to the currently displayed result subset.

The embodiment provides a method for data screening, which may provide the user with a path to return to the last screen result and achieve the recursive screen. The user may perform a further screen based on the current screen result, may return to the upper level screen result through the return key, may also jump directly to a certain screen result which has been screened through displayed screen element. The steps of re-selecting the screen element by the user are further reduced and the steps of screening are simplified.

Figure 7:
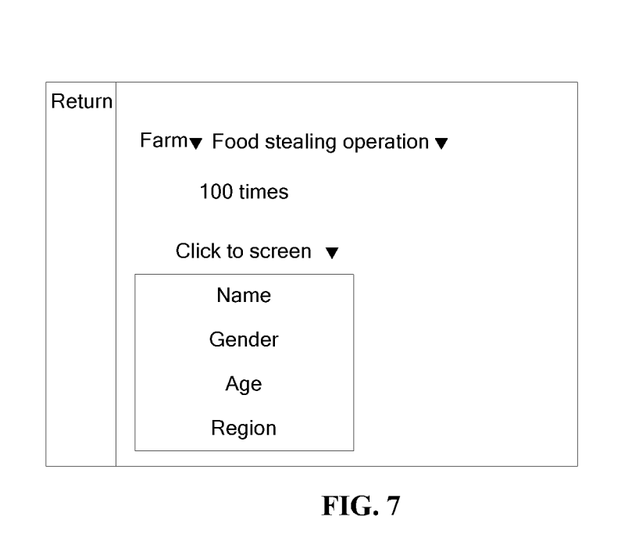
FIG. 7 is a schematic diagram of a first interface in an application scenario according to an embodiment.

The method of data screening according to an embodiment is further described through the following scenario:

A user starts a screening tool, the screening tool may be a component in the database, and may also be an independent screening tool. FIG. 7 shows an example based on Happy Farm, a resource management game based upon farming, in which players grow crops, trade with others, sell produce, and steal from neighbors. The raw data used for opening is the user information of the food stealing operation. The interface contains a navigation list, the 100 times of the food stealing operation, and a drop-down menu. Among them, the navigation list includes two screen elements of the farm and the food stealing operation. User information includes the following elements: the application name, operation type, name, gender, age, education, region. Since currently located in the farm-> food stealing operation interface, so the drop-down menu (the element list) contains elements of name, gender, age, education, region.

Figure 8:
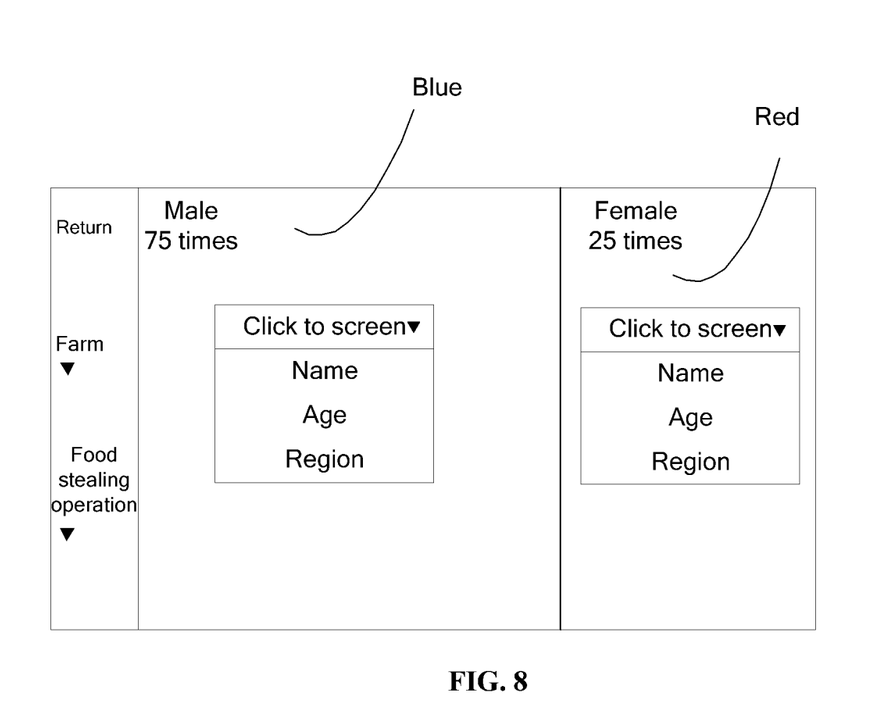
FIG. 8 a schematic diagram of a second interface in an application scenario according to an embodiment.

The user clicks the gender (the first screen element) in the drop-down menu. The records of gender "male" and "female" are screen and counted, and the records obtained have 75 records of gender "male" and 25 records of gender "female". Here, the longitudinal partition of the area of the rectangular planar graph in accordance with 75:25, and the area partition of 3:1 is obtained, as shown in FIG. 8. There is a navigation list on the left side of the planar graph which displays a return button, farm, food stealing operations in turn, from top to bottom. In the rectangle, the three-fourths region on the left (the first attribute region) is the number of records of gender "male", and the one-fourth region on the right (the second attribute region) is the number of records of gender "female". The region on the left also displays "male" (attribute value), the screened number of records of 75 and a drop-down menu, and the region on the right also displays "female" (attribute value), the screened number of records of 25 and a drop-down menu. Here, the drop-down menu contains the name, age, education, region. The filling color of the region on the left is blue, and the filling color of the region on the right is red.

Figure 9:
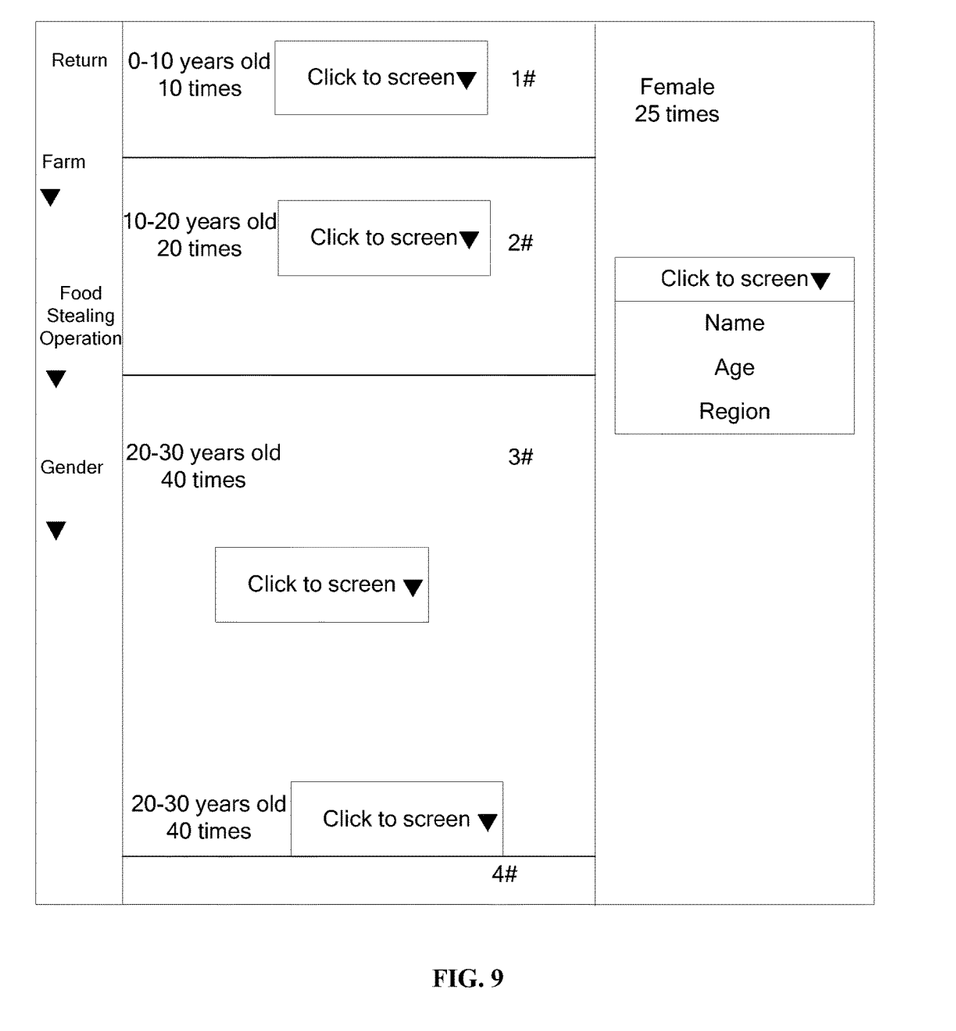
FIG. 9 a schematic diagram of a third interface in an application scenario according to an embodiment.

The user clicks on the age option (the second screen element) in drop-down menu in the left region. The numbers of records, corresponding to 10-20 years old (the attribute range), 20-30 years old, and 30 years old or older, are obtained from 75 records having the element of "male". If the numbers of records corresponding to the above age groups are respectively 10, 20, 40, 5, then the partition of the left region is performed according to the ratio of 10:20:40:5, four regions (the second attribute regions) with ratio of 10:20:40:5 are obtained, which are in turn 1#, 2#, 3#, 4#. The text information corresponding to the age groups, the corresponding numbers of records and the element list are displayed in the four regions, respectively. The filling colors of the above four regions in turn are pale blue, light blue, blue, dark blue. Here, the navigation list, from top to bottom, in turn displays the return button, farm, food stealing operation and gender. Here, the element list contains the name, education, region.

Figure 10:
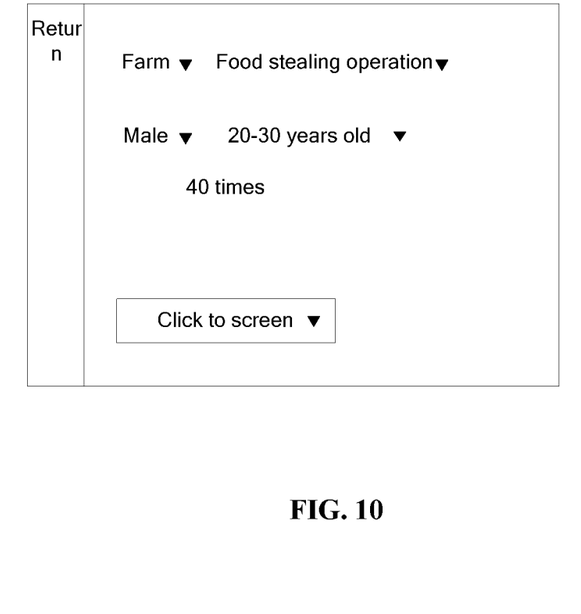
FIG. 10 a schematic diagram of a forth interface in an application scenario according to an embodiment.

Here, if the user clicks the "return" button in the navigation list in FIG. 9, the interface shown in FIG. 8 is displayed. If the user clicks "food stealing operation" entry in the navigation list in FIG. 9, then it returns to the interface shown in FIG. 7. If the user clicks the education of the element list in 3# region in FIG. 9, then as shown in FIG. 10, an new interface is created, the interface displays the current screen levels: farm-> food stealing operation-> male-> 20-30 years old, and return button, the element list, the corresponding the number of records. The user can also double-clicks 3# region in FIG. 9, an interface as shown in FIG. 10 is displayed according to the user's double-click instruction.

Figure 11:
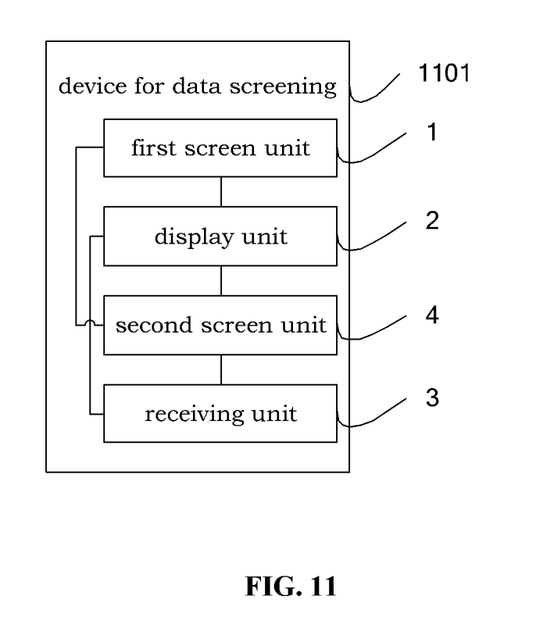
FIG. 11 is a structural schematic diagram of a device for data screening according to an embodiment.

The embodiment provides a device 1101 for data screening comprising at least a processor operating in conjunction with a memory and a plurality of units, the device can be a computing device or an electronic device, such as servers, computer, tablets, smart phones, etc. As shown in FIG. 11 (the processor(s) and the memory are not shown), the units comprises:

a first screen unit 1 adapted to screen raw data according to a first screen element to obtain a first result subset, the first result subset belongs to the raw data and is corresponding to the first screen element;

a display unit 2 adapted to display the first result subset screened by the first screen unit 1 and an element list;

a receiving unit 3 adapted to receive a second screen element selected by a user according to the element list displayed by the display unit 2;

a second screen unit 4 adapted to screen the first result subset screened by the first screen unit 1 according to the second screen element received by the receiving unit 3, to obtain a second result subset, the second result subset belongs to the raw data and is corresponding to the second screen element.

The display unit 2 is also adapted to display the second result subset screened by the second screen unit 4.

The device 1101 for data screening provided by the present application, the first screen unit 1 can screen raw data according to a first screen element received by the receiving unit 3, to obtain a first result subset; the display unit 2 can display the first result subset and an element list; the receiving unit 3 can receive a second screen element selected by a user according to the element list; the second screen unit 4 can screen the first result subset according to the second screen element, to obtain and display a second result subset, the display unit can display the second result subset. In the prior art, after the first result subset is displayed, the user cannot be provided with the element list, causing that the user needs to return to the check box interface when increasing screen elements and the operation steps are cumbersome. In the described technology, when the first result subset is displayed, the element list is also displayed at the same time. It provides a technical solution of performing further screen based on the previous result subset. When the user performs a further screen according to the first result subset, he/she only needs to continue to choose from the element list, but not needs to return to the previous operation interface, thereby reducing the number of times the user operates and simplifying screen operations.

Figure 12:
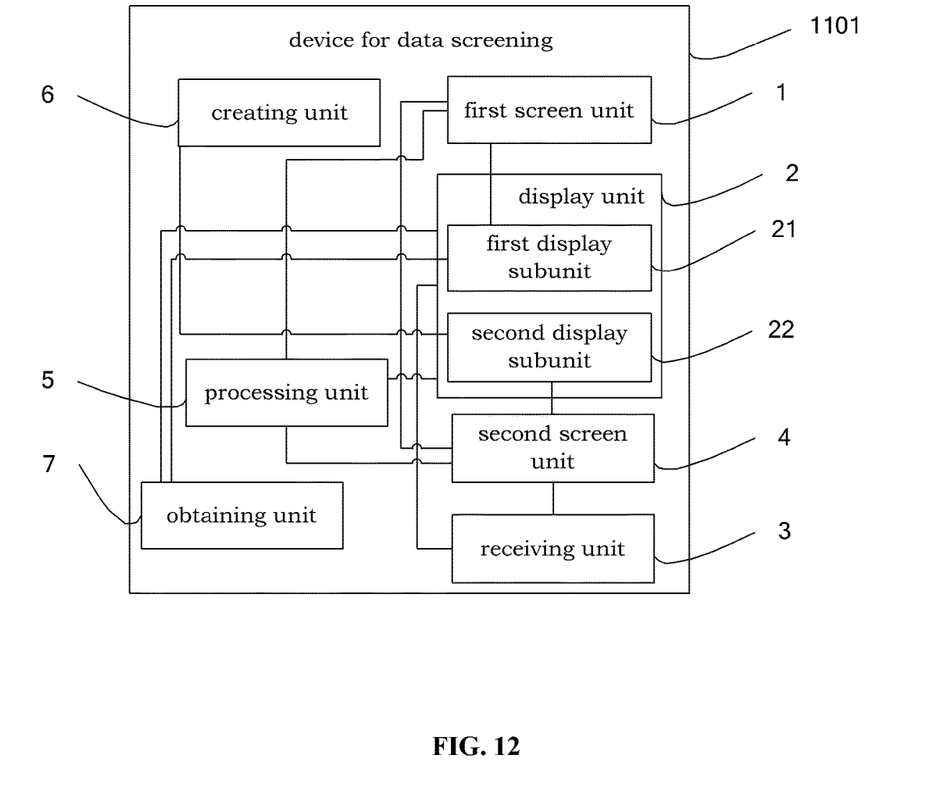
FIG. 12 is a structural schematic diagram of another device for data screening according to an embodiment.

An embodiment also provides a device for data screening 1101 as shown in FIG. 12, the device for data screening further comprises a processing unit 5, a creating unit 6 and an obtaining unit 7.

The processing unit 5 is adapted to determine a first ratio in the first result subset corresponding to a respective first attribute range or a respective first attribute value in the first result subset;

performing a first partition of an area of a planar graph according to the first ratio, to obtain at least one first attribute region, the number of the at least one first attribute region is equal to the number of the attribute ranges or attribute values, the planar graph is a graph having regular edges.

The processing unit 2 is also adapted to display the respective first attribute region in the planar graph and display the element list respectively in the respective first attribute region.

The processing unit 5 is also adapted to determine a second ratio in the second result subset corresponding to a respective second attribute range or a respective second attribute value in the second result subset screened by the second screen unit 4;

performing a second partition of the area of the first attribute region according to the second ratio, to obtain at least one second attribute region, the number of the at least one second attribute region is equal to the number of the second attribute ranges or attribute values.

The display unit 2 is also adapted to display the at least one second attribute region in the first attribute region.

Further, the processing unit 5 is also adapted to perform a longitudinal partition of the area of a rectangle according to the first ratio.

The processing unit 5 is also adapted to perform a transversal partition of the area of the first attribute region according to the second ratio.

Further, the display unit 2 comprises:

a first display subunit 21, adapted to display the respective first attribute region in the planar graph according to varied colors, the colors corresponding to the respective first attribute regions are different.

a second display subunit 22 is adapted to display the at least one second attribute region in the first attribute region according to varied transparencies or color intensities, the transparencies or color intensities corresponding to the respective second attribute regions are different.

The creating unit 6 is adapted to create a display interface when the area of the second attribute region is less than a predetermined area and the creating unit 6 receives the user's selection instruction.

The receiving unit 3 is also adapted to receive the user's confirmation instruction.

The creating unit 6 is also adapted to create a display interface according to the confirmation instruction received by the receiving unit 3.

The display unit 2 is also adapted to display the first attribute region in the display interface created by the creating unit 6.

The display unit 2 is also adapted to display the second attribute region in the first attribute region according to the second ratio obtained from the processing unit 5.

Further, the obtaining unit 7 is adapted to obtain the currently selected screen element.

The display unit 2 is also adapted to display the currently selected screen element according to the order in which the screen elements obtained by the obtaining unit 7 are selected.

The receiving unit 3 is also adapted to receive the user's selection instruction for selecting the currently selected screen element.

The obtaining unit 7 is also adapted to obtain the result subset corresponding to the screen element represented by the selection instruction according to the selection instruction received by the receiving unit 3.

The display unit 2 is also adapted to display the result subset obtained by the obtaining unit 7.

The device for data screening 1101 according to the embodiment may determine the first ratio according to the first screen element, display a first attribute region and the element list according to the first ratio, and thereby illustratively display the ratio relationship in the first result subset. By performing the first partition of the original graph and performing the second partition of the first attribute region, the ratio relationship between the respective attribute regions and the respective attribute values may be clearly displayed. By selecting the element list in the first attribute region, the user may perform further screen in one first attribute region and the user operation is simplified. Further, the device for data screening 1101 according to the embodiment may provide the user with a path to return to the last screen result and achieve the recursive screen. The user may perform a further screen based on the current screen result, may return to the upper level screen result through the return key, may also jump directly to a certain screen result which has been screened through displayed screen element. The steps of re-selecting the screen element by the user are further reduced and the steps of screening are simplified.

In a further aspect, an embodiment also provides a computer program product comprising program codes for performing the method described above according to the embodiments when the computer program product is executed on one or more computing devices. Optionally, the computer program product can be stored on a computer readable recording medium.

The person skilled in the art shall clearly understand, for the purpose of convenient and concise description, the functional modules are illustrated in the above exemplary embodiments. In practice, the above functions may be assigned to different functional modules as needed, that is, the internal structure of the device may be divided into different functional modules, to accomplish all or part of the functions described above. As for the specific operation process of the system described above, devices and units, a person skilled in the art may refer to the corresponding process in the aforementioned method embodiment which will not be iterated here.

In the embodiments, it should be understood that the disclosed system, device and method can be achieved in other ways. For example, the above-described device embodiments are merely illustrative, such as the division of the modules or units, which are only the division of the logical functions and may be divided in other ways in the actual implementation, for example a plurality of units or components can be combined or integrated into another system, or some features can be ignored, or not performed. Another point, the mutual coupling or direct coupling or communication connection discussed or displayed may be the indirect coupling or communication connection via certain interfaces, devices or unit, which may be electrical, mechanical, or in other forms.

The units illustrated as the separated components may be or may not be physically separated, the components displayed as the units may be or may not be physical units, which can be located in one place, or can be distributed to a plurality of network units. The purpose of the solution of the embodiments may be achieved by selecting part or all units according to the actual needs.

Further, in various embodiments of the described technology, the respective functional units may be integrated in one processing unit, or each unit may be physically presented respectively, or two or more units may be integrated in one unit. The integrated units can be achieved in the form of hardware, and also be achieved in the form of software functional units.

If said integrated unit is achieved in the form of software functional unit and is sold or used as an independent product, it can be stored in a computer readable storage medium. Based on this understanding, the technical solution of the described technology substantially, or the part make contribution over the prior art, or all or part of the technical solution may be embodied in the form of the software products. The computer software product is stored in a storage medium, including a number of instructions for making a computer device (may be a personal computer, a server, or a network equipment, etc.) or a processor execute all or part of steps of the method according to the embodiments of the described technology.

The abovementioned storage medium includes: U disk, mobile hard disk, read only memory (ROM, Read-Only Memory), random access memory (RAM, Random Access Memory), magnetic disk, or CD-ROM, and other media capable of storing program codes.

The contents above are only embodiments of the described technology rather than limiting the scope of the described technology. Any changes or substitutes which can be easily thought of by a person skilled in the art within the disclosure of the described technology should be covered within the scope of protection. Thus, the scope of the invention should be determined by the protection scope of the claims.

What is claimed is:

1. A method for data screening performed by a computing device, wherein the method comprises:
   screening raw data according to a first screen element to obtain a first result subset, the first result subset belonging to the raw data and corresponding to the first screen element;
   displaying the first result subset and an element list, wherein the element list contains screen elements to be selected by a user;
   receiving a second screen element selected by the user from the element list;
   screening the first result subset according to the second screen element to obtain a second result subset, the second result subset belonging to the raw data and corresponding to the second screen element; and
   displaying the second result subset; wherein
   the step of displaying the first result subset and the element list includes:
      determining a first ratio in the first result subset corresponding to a respective first attribute range or a respective first attribute value in the first result subset associated with the first screen element;
      performing a first partition of an area of a planar graph according to the first ratio, to obtain a plurality of attribute regions including a first attribute region, a number of the plurality of attribute regions being equal to a number of the attribute ranges or attribute values, the planar graph is a graph having regular edges; and
      displaying each attribute region in the planar graph and displaying the element list respectively in each attribute region; and
   the step of displaying the second result subset includes:
      determining a second ratio in the second result subset corresponding to a respective second attribute range or a respective second attribute value in the second result subset associated with the second screen element;
      performing a second partition of the area of the first attribute region according to the second ratio, to obtain at least one second attribute region, the number of the at least one second attribute region is equal to a number of the second attribute ranges or attribute values;
      removing the element list respectively displayed in the first attribute region; and
      displaying the at least one second attribute region in the first attribute region.

2. The method according to claim 1, wherein the step of performing a first partition of an area of a planar graph according to the first ratio comprises:
   performing a longitudinal partition of the area of a rectangle according to the first ratio, and
   the step of performing a second partition of the area of the first attribute region according to the second ratio comprises: performing a transversal partition of the area of the first attribute region according to the second ratio.

3. The method according to claim 1, wherein the step of displaying the respective first attribute region in the planar graph comprises:
   displaying the respective first attribute region in the planar graph according to varied colors, the colors corresponding to the respective first attribute regions being different, and
   the step of displaying the at least one second attribute region in the first attribute region comprises:
   displaying the at least one second attribute region in the first attribute region according to varied transparencies or color intensities, the transparencies or color intensities corresponding to the respective second attribute regions being different.

4. The method according to claim 1, wherein the method further comprises:
   if the area of the second attribute region is less than a predetermined area, creating a display interface when receiving a selection instruction of the user, or creating a display interface according to a confirmation instruction of the user;
   displaying the first attribute region in the display interface; and
   displaying the second attribute region in the first attribute region according to the second ratio.

5. The method according to claim 1, wherein the method further comprises:
   obtaining a currently selected screen element;
   displaying the currently selected screen element according to an order in which the screen elements are selected;
   receiving a selection instruction of the user for selecting the currently selected screen element; and
   obtaining and displaying a result subset corresponding to the screen element represented by the selection instruction according to the selection instruction.

6. A device for data screening comprising at least a processor operating in conjunction with a memory and a plurality of units, wherein the units comprises:
   a first screen unit adapted to screen raw data according to a first screen element to obtain a first result subset, the first result subset belonging to the raw data and corresponding to the first screen element;
   a display unit adapted to display the first result subset screened by the first screen unit and an additional element list, wherein the element list contains the selected elements;
   a receiving unit adapted to receive a second screen element selected by a user according to the element list displayed by the display unit; and
   a second screen unit adapted to screen the first result subset screened by the first screen unit according to the second screen element received by the receiving unit, to obtain a second result subset, the second result subset belonging to the raw data and corresponding to the second screen element;
   wherein the display unit is also adapted to display the second result subset screened by the second screen unit and wherein:
   the device further includes a processing unit, and the processing unit is adapted to determine a first ratio in the first result subset corresponding to a respective first attribute range or a respective first attribute value in the first result subset associated with the first screen element, and perform a first partition of an area of a planar graph according to the first ratio to obtain a plurality of attribute regions, a number of the plurality of attribute regions being equal to a number of the attribute ranges or attribute values, the planar graph being a graph having regular edges;

the processing unit is also adapted to display each attribute region in the planar graph and display the element list respectively in each attribute region;

the processing unit is also adapted to determine a second ratio in the second result subset corresponding to a respective second attribute range or a respective second attribute value in the second result subset associated with the second screen element, and perform a second partition of the area of the first attribute region according to the second ratio to obtain at least one second attribute region, a number of the at least one second attribute region being equal to a number of the second attribute ranges or attribute values;

removing the element list respectively displayed in the first attribute region; and the display unit is also adapted to display the at least one second attribute region in the first attribute region.

7. The device according to claim 6, wherein the processing unit is also adapted to perform a longitudinal partition of the area of a rectangle according to the first ratio, and the processing unit is also adapted to perform a transversal partition of the area of the first attribute region according to the second ratio.

8. The device according to claim 6, wherein the display unit comprises:
  a first display subunit, adapted to display the respective first attribute region in the planar graph according to varied colors, the colors corresponding to the respective first attribute regions being different; and
  a second display subunit, adapted to display the at least one second attribute region in the first attribute region according to varied transparencies or color intensities, the transparencies or color intensities corresponding to the respective second attribute regions being different.

9. The device according to claim 6, wherein the device further comprises a creating unit adapted to create a display interface when the area of the second attribute region is less than a predetermined area and the creating unit receives a selection instruction of the user, the receiving unit is also adapted to receive a confirmation instruction sent by the user,
  the creating unit is also adapted to create a display interface according to the confirmation instruction received by the receiving unit,
  the display unit is also adapted to display the first attribute region in the display interface created by the creating unit, and
  the display unit is also adapted to display the second attribute region in the first attribute region according to the second ratio obtained by the processing unit.

10. The device according to claim 6, wherein the device further comprises an obtaining unit adapted to obtain a currently selected screen element,
  the display unit is also adapted to display the currently selected screen element according to an order in which the screen elements obtained by the obtaining unit are selected,
  the receiving unit is also adapted to receive a selection instruction of the user for selecting the currently selected screen element,
  the obtaining unit is also adapted to obtain a result subset corresponding to the screen element represented by the selection instruction according to the selection instruction received by the receiving unit,
  the display unit is also adapted to display the result subset obtained by the obtaining unit.

11. A computer program product for performing data screening comprising:
  a non-transitory computer readable medium having computer readable program code embodied therein that, when executed by a processor, causes the processor to:
  screen raw data according to a first screen element to obtain a first result subset, the first result subset belonging to the raw data and corresponding to the first screen element;
  display the first result subset and an additional element list and receiving a second screen element selected by a user according to the element list, wherein the element list contains the selected elements;
  screen the first result subset according to the second screen element to obtain a second result subset, the second result subset belonging to the raw data and corresponding to the second screen element; and
  display the second result subset; wherein,
  the step of displaying the first result subset and the element list includes:
    determining a first ratio in the first result subset corresponding to a respective first attribute range or a respective first attribute value in the first result subset associated with the first screen element;
    performing a first partition of an area of a planar graph according to the first ratio, to obtain a plurality of attribute regions including a first attribute region, a number of the plurality of attribute regions being equal to a number of the attribute ranges or attribute values, the planar graph is a graph having regular edges; and
    displaying each attribute region in the planar graph and displaying the element list respectively in each attribute region,
  and the step of displaying the second result subset includes:
    determining a second ratio in the second result subset corresponding to a respective second attribute range or a respective second attribute value in the second result subset associated with the second screen element;
    performing a second partition of the area of the first attribute region according to the second ratio, to obtain at least one second attribute region, a number of the at least one second attribute region is equal to a number of the second attribute ranges or attribute values;
  removing the element list respectively displayed in the first attribute region; and
    displaying the at least one second attribute region in the first attribute region.

* * * * *